(12) United States Patent
Marsh et al.

(10) Patent No.: US 7,421,344 B1
(45) Date of Patent: Sep. 2, 2008

(54) SYSTEM AND METHOD FOR PRESENTING PERSONALIZED WEATHER INFORMATION AND THE LIKE

(75) Inventors: Victor W. Marsh, Madison, WI (US); Randall T. Wiggins, Madison, WI (US)

(73) Assignee: Weather Central, Inc., Madison, WI (US)

( * ) Notice: Subject to any disclaimer, the term of this patent is extended or adjusted under 35 U.S.C. 154(b) by 0 days.

(21) Appl. No.: 11/523,751

(22) Filed: Sep. 19, 2006

Related U.S. Application Data

(63) Continuation of application No. 10/955,329, filed on Sep. 30, 2004, now abandoned.

(60) Provisional application No. 60/507,275, filed on Sep. 30, 2003.

(51) Int. Cl.
*G01W 1/00* (2006.01)

(52) U.S. Cl. ............................................. 702/3; 702/5

(58) Field of Classification Search ................... 702/3, 702/4, 5
See application file for complete search history.

(56) References Cited

U.S. PATENT DOCUMENTS

| | | | | |
|---|---|---|---|---|
| 6,023,223 A | * | 2/2000 | Baxter, Jr. ................... 340/531 |
| 6,297,766 B1 | * | 10/2001 | Koeller ................. 342/357.06 |
| 6,339,747 B1 | * | 1/2002 | Daly et al. ..................... 702/3 |
| 6,360,172 B1 | * | 3/2002 | Burfeind et al. ................ 702/2 |
| 6,498,987 B1 | * | 12/2002 | Kelly et al. ..................... 702/3 |
| 6,542,825 B2 | * | 4/2003 | Jones et al. ..................... 702/3 |
| 6,581,009 B1 | * | 6/2003 | Smith ............................ 702/3 |
| 6,590,529 B2 | * | 7/2003 | Schwoegler ............ 342/357.13 |
| 6,603,405 B2 | * | 8/2003 | Smith .......................... 340/905 |
| 6,792,615 B1 | * | 9/2004 | Rowe et al. ................... 725/37 |
| 6,823,263 B1 | * | 11/2004 | Kelly et al. ..................... 702/3 |
| 6,845,324 B2 | * | 1/2005 | Smith ............................ 702/3 |
| 6,963,853 B1 | * | 11/2005 | Smith ........................... 700/90 |
| 2001/0030624 A1 | * | 10/2001 | Schwoegler ............ 342/357.13 |
| 2002/0133295 A1 | * | 9/2002 | Schwinn et al. ................ 702/4 |
| 2004/0049345 A1 | * | 3/2004 | McDonough et al. ......... 702/12 |

* cited by examiner

*Primary Examiner*—Donald E McElheny, Jr.
(74) *Attorney, Agent, or Firm*—Boyle Fredrickson, S.C.

(57) ABSTRACT

A system and method for generating weather reports and the like which are precisely computed automatically for a particular individual user's geographic location, e.g., home or work, and which are provided to the individual user in both graphical and textual format in a user interactive manner. A personalized weather report presentation in accordance with the present invention may include a tabular presentation of a plurality of forecast weather conditions for the user location of interest throughout a day, along with a linked graphical representation of at least one of those weather conditions overlaid on a map centered at the user location of interest. Under user control, the user may select the time of the forecast weather conditions shown in the graphical portion of the presentation.

20 Claims, 13 Drawing Sheets

Please supply the following information so we can create your personalized weather web page.

1 - Enter your first and last name      ⟋42

First: | Vic |
Last: | Smith | ⟵ 44

2 - Select where your "base" forecast location will be

This is the location for which we will create your daily forecast. You will be able to request forecasts for other locations as part of your personalized weather web page.

| Home ▼ |

3- Enter the address of your base location

Street Address (for best results, put spaces between words and do not use abbreviations)
| 1027 East Way |

City
| Madison |      ⟵ 46

State | ZIP Code
| WI | | 53701 |

4 - Enter your email address

This email address will be used to notify you of the link to your personal weather page. You need to supply a vaild email address to receive your personal page.

Email Address
| vsmith@myweather.com |    ⟵ 48

Does your email software accept HTML (email with colors and graphics)?
| Yes ▼ |

5 - Enter a password *(please type twice for confirmation)*

Password      Password (confirm)      ⟵ 52
| |    | |

6 - Please provide this information to help us personalize your weather page *(optional)*

Occupation      ⟵ 50
| Professional ▼ |

FIG. 3A

Age
| 35-39 ▼ |

Gender ← 50
| Male ▼ |

Activities
| golf ▲ |
| camping |
| lawn and garden |
| outdoor fitness ▼ |

*To select more than one activity, hold down the control key (PC) or the command key (Mac) when selecting activities.*

Household Income
| $100,000+ ▼ |

7 - Select the items you want to be notified about

In addition to your personalized weather web page, you may also elect to receive email notices.

Send weather updates from our meteorologists: ☑ every morning  ☑ every afternoon ☑ Send emails for severe weather conditions in my area.

8 - Contact Information

Because this is a new service, your experience with it is important to us. May we contact you later about your impressions and experiences?

☑ You may contact me

Daytime Phone
(area code) *NNN-NNNN* [            ]

Evening Phone
(area code) *NNN-NNNN* [            ]

☑ Include me in station promotion activities

9 - Click on Submit to activiate your personal weather web page

Please verify that the information you have supplied is correct before activating your subscription.

[ Submit ]  [ Reset ]

FIG. 3B

SYSTEM AND METHOD FOR PRESENTING PERSONALIZED WEATHER INFORMATION AND THE LIKE

This application is a continuation of prior application Ser. No. 10/955,329, filed Sep. 30, 2004, abandoned, which claims the benefit of U.S. Provisional Patent Application No. 60/507,275 filed on Sep. 30, 2003.

FIELD OF THE INVENTION

The present invention pertains generally to systems and methods for producing weather reports including current weather conditions and weather forecasts, and, more particularly, to systems and methods for providing such weather reports and forecasts to individuals, e.g., over computer networks such as the internet.

BACKGROUND OF THE INVENTION

Most of the current weather and weather forecast information used by individuals is obtained by them from weather reports provided by local television and radio stations. Such reports are typically prepared by meteorologists at a television or radio station serving a particular geographical area, e.g., a large city and surrounding environs. The reports are based on current weather information available to the meteorologist which may be provided by various local (e.g., local radar) and national (e.g., NEXRAD radar and weather satellite) weather information sources. A meteorologist may also employ computer implemented weather forecasting models in preparing a weather forecast report. A meteorologist may prepare and/or update several such reports throughout the day, and such reports may be provided as part of periodic radio and/or television broadcasts. Such weather reports and forecasts may also be provided in printed form, e.g., in a daily newspaper. A person who is interested in the current or forecast weather conditions for a geographic location accesses such a weather report by tuning in to the television or radio broadcast of the report at the designated time, reading the paper, etc. If severe weather threatens a particular area, an emergency radio or television broadcast may be made to provide such information to the public immediately, and, if necessary, continuously. For example, a television station may provide a graphic indication of the general location (e.g., county) and nature of severe weather, (e.g., tornado, and thunderstorm warnings, etc.) as part of its television broadcast, throughout the period during which severe weather threatens an area.

A severe limitation of such conventional weather reports and forecasts is that they are generalized over a large geographic area and, typically, an extensive period of time. For example, a typical conventional weather forecast will provide predicted high and low temperatures, sky conditions, precipitation, etc., for the day, or for several days, for a particular geographical area, e.g., the city where the television or radio station is located and the surrounding area. However, the actual current and forecast weather conditions for the downtown area of a city, the suburbs, and surrounding rural areas will, of course, be different. For example, different areas in and around the city will achieve different high and low temperatures at different times during the day, and precipitation will reach different points in a television station's viewing area at different times during the day and at different levels of intensity. A meteorologist's forecast may indicate that some areas within a television station's viewing area will receive significant precipitation during the day, while other areas will receive none (e.g., a forecast of "widely scattered showers"). Thus, generalized weather conditions and forecasts for a particular area, e.g., a television or radio station viewing and/or listening area, may be of limited use to any particular individual, especially individuals living or working outside of a central city area, in that such general information will not provide an accurate indication of, e.g., high and low temperatures and sky conditions at any particular time during the day at that individual's home or place of work, and when, how much, or even if precipitation will arrive at that individual's home or place of work. Businesses, in particular, may require more specific and detailed weather forecast information. For example, the forecast weather conditions at a particular construction location may be used to decide which activities will take place at that site on a particular day. Generalized weather forecasts for a relatively large area are of limited usefulness to such businesses.

Advances in computer connectivity technology have allowed television and radio station meteorologists and other weather information service providers to provide access to their latest weather condition and forecast reports via computer over the internet at any time desired. Thus, an individual need not try to catch the local television or radio broadcast of a weather report to get the latest weather information. An individual may be able to access weather reports and other outdoor information for both local and remote geographic locations via computer over the Internet.

Complex weather forecasting models exist which can be used to generate accurate and detailed weather forecast data for narrowly defined geographic locations and periods in time. An example of such a weather forecasting model is the ADONIS model, available from Weather Central, Inc., of Madison, Wis. This model is based on a three-dimensional weather forecasting model of the atmosphere developed originally by Colorado State University and the University of Wisconsin. This model is a non-hydrostatic model, which therefore takes into account changing atmospheric moisture conditions, as well as topography, snow cover, etc., in generating weather forecast data. The model is, therefore, highly accurate. Some weather forecasting models, including ADONIS, are capable of producing weather forecast data with both high geographic and temporal resolution. For example, the ADONIS model may be run to provide detailed forecast data (e.g., temperature, sky conditions, wind, precipitation, etc., for, e.g., up to 25 different vertical levels of the atmosphere) for geographical areas only a few miles across and in half hour increments extending several days into the future. By extrapolation between such closely spaced points for which weather forecast model data is generated, accurate forecast weather conditions for any modeled time at any point in a modeled geographic area may be obtained. To be useful, such highly detailed models must be capable of producing thousands of near-real-time individualized weather forecasts in order to be useful to individuals requiring precise pinpoint forecasts.

U.S. Pat. No. 6,498,987 and U.S. patent application Ser. No. 09/686,029, both entitled System and Method for Providing Personalized Weather Reports and the Like, describe a system and method for making use of such highly detailed weather forecast models for generating weather reports and the like which are precisely computed automatically for a particular individual user's geographic location, e.g., home or work, and which may be provided automatically, over a variety of media, such as the Internet, directly to the individual user or business. In accordance with the invention described in these references, a user establishes an individualized user profile in which the user defines a particular location of interest (e.g., home or work), and a contact address (e.g., e-mail address or pager number) to which the personalized weather report is to be delivered. The user profile may be established by the user via a user profile graphical user interface provided to the user over the Internet. Alternatively, or additionally, an address at which the personalized weather report is to be made available, e.g., a personalized Internet web page address, may be generated automatically and provided to the user. A detailed and accurate weather forecasting model is run to provide high geographical and temporal resolution forecast data. This high resolution forecast data is compared to the individual user profile and a personalized weather forecast and report for the particular location of interest to the individual is generated and provided directly to the individual, e.g., made available to the user at the user's personalized Internet web page address. The high resolution weather forecast model data may, optionally, be constrained to within certain limits, e.g., using constraints established by a meteorologist, before the model data is used to generate a personalized weather report. Personalized weather forecast reports provided to the user may include detailed information on forecast weather conditions, e.g., high and low temperatures, the times those temperatures will be reached, sky conditions, wind conditions, whether or not there will be frost or dew, etc., for the specific user location identified by the user in the user profile. A summary personalized weather report may be provided, e.g., as an e-mail message, to the user's contact address, with a link to the user's personalized internet web page provided therein. Detailed weather forecast conditions for periods (e.g., hours) throughout a day are provided in an easily readable form, such as a tabular form, wherein, for example, high and low temperatures, periods of precipitation, etc., are highlighted.

What is desired, however, is an improved system and method for presenting personalized weather report information to users in an improved user interactive manner.

SUMMARY OF THE INVENTION

The present invention provides a system and method for generating weather reports and the like which are precisely computed automatically for a particular individual user's geographic location, e.g., home or work, and which are provided to the individual user in both graphical and textual format in a user interactive manner. In accordance with the present invention, an individual or business user is provided great control over the manner in which a personalized weather forecast report is presented to him. In accordance with the present invention, a user establishes an individualized user profile in which the user defines a particular location of interest (e.g., home or work). A detailed and accurate weather forecasting model is run to provide high geographical and temporal resolution forecast data. This high resolution forecast data is compared to the individual user profile and a personalized weather report presentation in accordance with the present invention is generated for the particular location of interest to the individual and for a surrounding geographic area. The personalized weather report presentation may be provided to the user at a personalized Internet web page address that is accessible by the user. In accordance with the present invention, the personalized weather report presentation provided to the user includes both textual and graphical elements which are under user control. For example, a personalized weather report presentation in accordance with the present invention may include a tabular presentation of a plurality of forecast weather conditions for the user location of interest throughout a day, along with a linked graphical representation of at least one of those weather conditions overlaid on a map centered at the user location of interest. Under user control, the user may select the time of the forecast weather conditions shown in the graphical portion of the presentation.

An exemplary system for providing personalized weather reports in accordance with the present invention includes a main computer system that includes weather forecast modeling software for calculating and presenting high geographical and temporal resolution forecast data. The weather forecasting model preferably accepts and stores as inputs thereto weather model initialization data, e.g., initial atmospheric condition information, which may be generated and provided from a central location to the main computer system (e.g., by satellite or internet data delivery). The forecast model may be run periodically, e.g., twice a day, or each time initialization conditions are received by the main computer, to provide high resolution forecast data and personalized weather report presentations in accordance with the present invention each time the model is run.

The main computer system preferably includes a user profile generator. The user profile generator provides various user profile set-up menu user interfaces that allow a user to establish a user profile. These menus may be accessed by a user by use of, for example, a personal computer connected to the main system computer over a network such as the Internet. Using such menus, a user establishes a personal user profile that includes a particular location of interest, e.g., home, vacation home, or work, for which the user would like a detailed weather report presentation. The user may also establish a user contact address, e.g., e-mail address or pager number, and other relevant profile information. In response to the establishment of a user profile, the computer system may generate automatically a personalized internet web page address at which the user's personalized weather report presentation will be accessible. This user profile information may be stored in a user profile database.

Each time the high resolution forecast model is run, and/or each time a request for a personalized weather report presentation is received from a user, the resulting forecast data is compared to the user profiles saved in the user profile database and personalized weather report presentations in accordance with the present invention may be generated automatically by a personalized report generator implemented in the main computer system. Automated detailed personalized report generation is possible using a high resolution weather forecasting model, such as ADONIS, which provides as an output exact and discreet weather condition readings for specific points in time at pinpoint lat./lon. locations covering an entire geographic area of interest. Such high resolution weather forecast model data may, optionally, be constrained to within certain limits, e.g., using constraints established by a meteorologist, before the model data is used to generate a personalized weather report presentation in accordance with the present invention. The user location provided in the user profile may be converted to a lat./lon. coordinate and used to pull automatically detailed forecast weather conditions for that location and a surrounding geographic area from the forecast model data to generate the personalized weather report presentation.

Personalized weather report presentations in accordance with the present invention may be provided to users at their personalized Internet web page addresses. A personalized weather report presentation in accordance with the present invention preferably includes detailed information on a variety of forecast weather conditions, e.g., high and low temperatures, the times those temperatures will be reached, sky conditions, wind conditions, wind chill ("feels like") temperatures, humidity, whether or not there will be frost or dew, etc., for the specific user location identified by the user in the user profile. A preferred personalized weather report presentation in accordance with the presentation preferably includes a textual or tabular presentation of such various forecast weather conditions for the specific user location of interest for a plurality of time periods (e.g., hours throughout a day) along with a linked or coordinated graphical display of one of the forecast weather conditions for a particular time overlaid on a map display. Preferably the map display is centered at the user location of interest. The user preferably is able to select from among a plurality of weather conditions, e.g., precipitation and cloud cover, temperature, humidity, rain accumulation, snow accumulation, wind gusts, "feels like" temperatures, etc. to be presented on the graphical display portion of the presentation. The time of the graphical presentation preferably is highlighted or otherwise indicated in the tabular or textual presentation. A user may select the time to be displayed in the graphical presentation by interaction with the tabular or textual portion of the presentation, e.g., by clicking on the desired time in the forecast weather condition table. Preferably user controls are provided, which allow the user also to move through a sequential series of graphical displays, either backward or forward, or to animate the graphical presentation by showing a series of such displays in sequence automatically.

Further objects, features, and advantages of the invention will be apparent from the following detailed description taken in conjunction with the accompanying drawings.

BRIEF DESCRIPTION OF THE DRAWINGS

In the drawings:

FIG. 3 is an exemplary user profile set-up menu user interface for use in a system and method for providing personalized weather report presentations in accordance with the present invention.

DETAILED DESCRIPTION OF THE INVENTION

Figure 1:
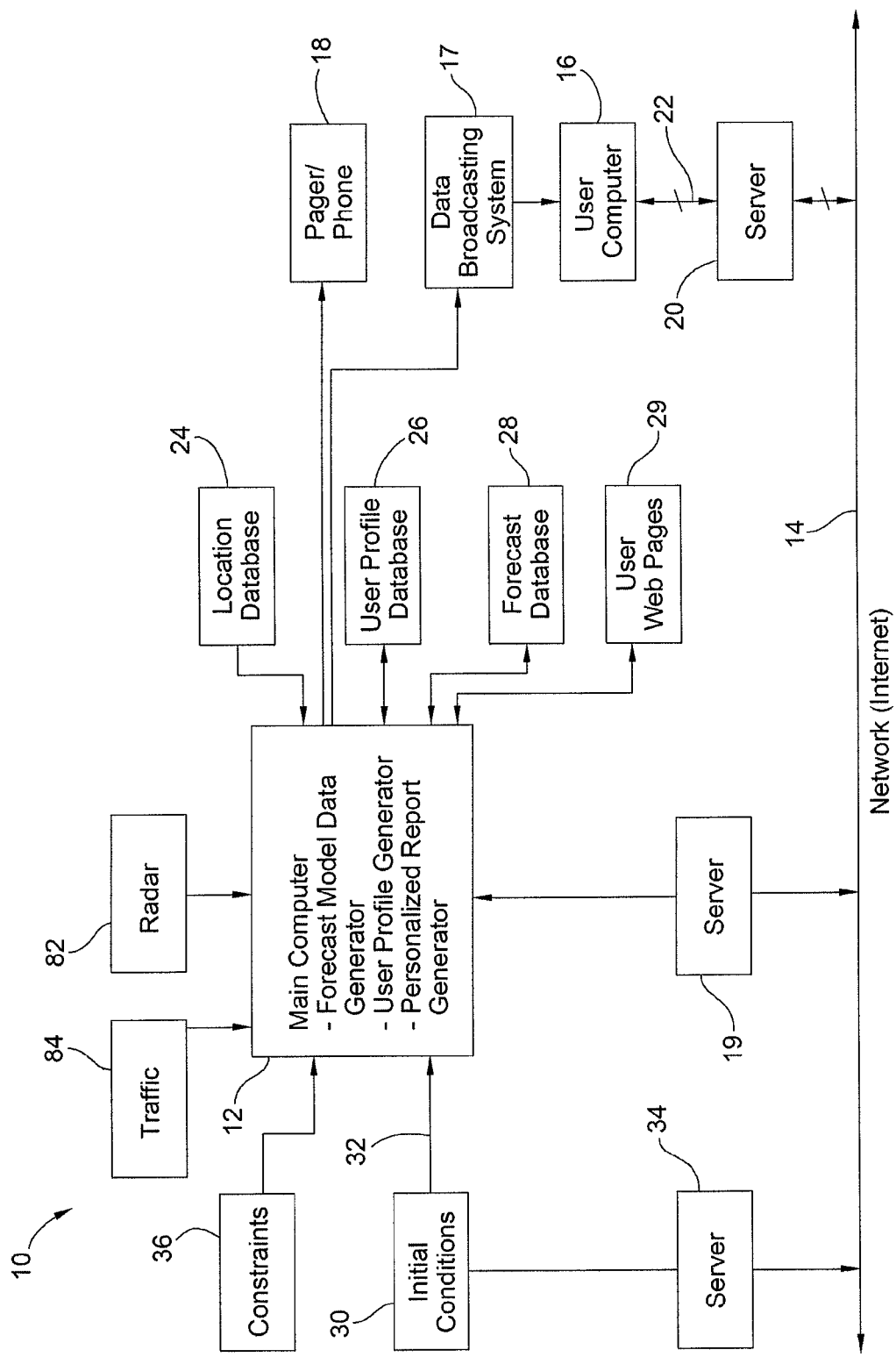
FIG. 1 is a schematic block diagram of an exemplary system for providing personalized weather report presentations in accordance with the present invention.

A schematic block diagram of an exemplary system 10 for providing personalized weather report presentations in accordance with the present invention is illustrated in, and will be described in detail with reference to, FIG. 1. In accordance with the present invention, personalized weather report presentations, and the like, are generated by a main computer system 12 which communicates, e.g., via a network connection 14 with a user's computer 16. The main computer system 12 may be implemented as one or more conventional computers. The user's computer 16 may be implemented in a conventional manner as a personal or handheld wireless computer, Web TV terminal, digital television system, or the like. Two-way communications between the main computer system 12 and the user's computer 16 may be provided over any suitable communications network or link 14. Alternatively, communications between the main computer 12 and the user's computer 16 may be via any known or future data broadcasting system 17. The main computer 12 may also be in communication with a user's alphanumeric pager or cellular or other telephone 18, for providing personalized weather report presentations to the user thereby, as will be discussed in more detail below.

Preferably, and conveniently, the main computer system 12 and the user's computer 16 may communicate with each other via the Internet 14, using conventional and widely known Internet communications formats, protocols, etc. The main computer system 12 and user's computer 16 may be connected to the Internet 14 in a conventional manner via servers 19 and 20, respectively. Note that the server 19 providing an Internet connection for the main computer system 12 may be separate from or an integral part of the main computer system 12. The server 20 providing an Internet connection for the user computer 16 typically may be provided by a commercial Internet service provider. Communications between the user's computer 16 and the Internet service provider's server 20 typically may be accomplished using a modem connection for communication over conventional telephone lines, cable television lines, or other physical or wireless links 22. It should be understood that the central computer system 12 may provide personalized weather report presentations in accordance with the present invention to many user computers 16 connected to the main computer system 12 over the Internet 14. For example, a single Internet service provider's server 20 may provide a connection to the central computer 12 over the Internet 14 for many user computers 16, and an essentially unlimited number of servers 20 may be on the Internet 14.

As mentioned above, the main computer system 12 may be implemented in a conventional manner using a single computer or multiple computers networked together to perform the functions required. The main computer system 12 may include conventional computer peripheral devices (not shown), including input and output devices such as keyboards, mouses, monitors, printers, etc. The main computer system 12 will also include conventional computer memory devices, including disk or tape storage devices for storing the computer programs which will be run on the main computer system 12 to implement a method for providing personalized weather report presentations and the like in accordance with the present invention. Memory, e.g., disk storage space, etc., is also provided for the storage of databases of information which is employed by the programs running on the main computer system 12 for generating personalized weather report presentations and the like. Such databases include a geographic location database 24, a user profile database 26, and a weather forecast database 28. The use of each of these databases 24, 26, and 28 in generating a personalized weather report in accordance with the present invention will be described in detail below. It should be noted that information in each database 24, 26, and 28 may be stored in its own memory device, e.g., disk, or together on the same disk or other memory device. Memory capacity 29 preferably also is provided for storing personalized weather reports generated by the computer 12 in the form of personalized user Internet web pages, as will be described in more detail below.

In accordance with the present invention, the main computer system 12 is programmed, using conventional programming techniques, to perform various functions to provide personalized weather report presentations to users. Such functions to be performed by the main computer 12 include a weather forecast model data generator function, a user profile generator function, and a personalized report generator function. Each of these functions will be described in more detail below.

Any conventional commercially available weather forecasting model may be employed in the main computer system 12 to implement the weather forecast model data generator function. Such models typically generate modeled weather forecast data based on atmospheric condition initialization data. Preferably, the weather forecasting model employed is capable of providing highly detailed and accurate weather forecasts of various weather parameters of interest, e.g., temperature, sky conditions, winds, precipitation, etc., with a high degree of both geographical and temporal resolution. An example of such a preferred weather forecasting model is the ADONIS model, available from Weather Central, Inc., of Madison, Wis. As discussed above, this non-hydrostatic model is capable of providing accurate and detailed forecast weather parameters for geographical areas a few miles across at half-hour increments for at least 120 half-hour periods into the future. (The degree of geographic and temporal resolution is user adjustable, and may be provided over longer or shorter time periods.) Based on calculated forecast weather parameters for discrete closely spaced points in a geographic area, the system automatically and accurately extrapolates forecast weather conditions for any lat./lon. coordinate within the modeled area. This model employs initial atmospheric condition data 30 which is computed at a central location from "raw" observational data provided by the National Weather Service and other agencies. The initialization data 30 is provided periodically, e.g., twice a day, from the central location to the main computer system 12. The initial conditions 30 may be provided to the main computer system 12 running the weather forecasting model via a direct communication link 32 (e.g., a satellite link) or, alternatively, via the internet 14, via a server 34, in either case using conventional data transfer protocols.

The detailed high resolution weather forecast model data generated by the forecasting model employed in the computer system 12 may be subject to constraints, provided via constrainer module 36, before such model data is employed to generate a personalized weather report in accordance with the present invention. The constraints 36 may be provided to the computer system 12 in a variety of ways, for example, constraints 36 may be provided to the main computer system 12 by a meteorologist or other operator entering such constraints directly into the computer system 12 via a keyboard or other input devices associated therewith. Alternatively, or additionally, constraints 36 may be provided to the computer system 12 from a remote location, e.g., via a direct communications link (e.g., a satellite link) or via the Internet 14 or another communications network. Constraints 36 may be applied to any modeled weather condition, e.g., temperature, wind speed, precipitation, etc., and may be applied throughout an entire modeled geographic area, or to selected portions thereof. The constraints 36 limit the modeled weather conditions which are used to generate personalized weather report presentations in accordance with the present invention to enhance the accuracy of such reports. For example, a meteorologist may determine, based on experience and/or information which is not available to the model employed, that, for example, the forecast high temperature or precipitation for a modeled region and time will not exceed certain levels. Such limits may be provided to the computer system 12 as constraints 36, to ensure that no personalized weather report presentation for locations within such region forecasts predicted temperatures or precipitation exceeding the constrained levels.

Figure 2:
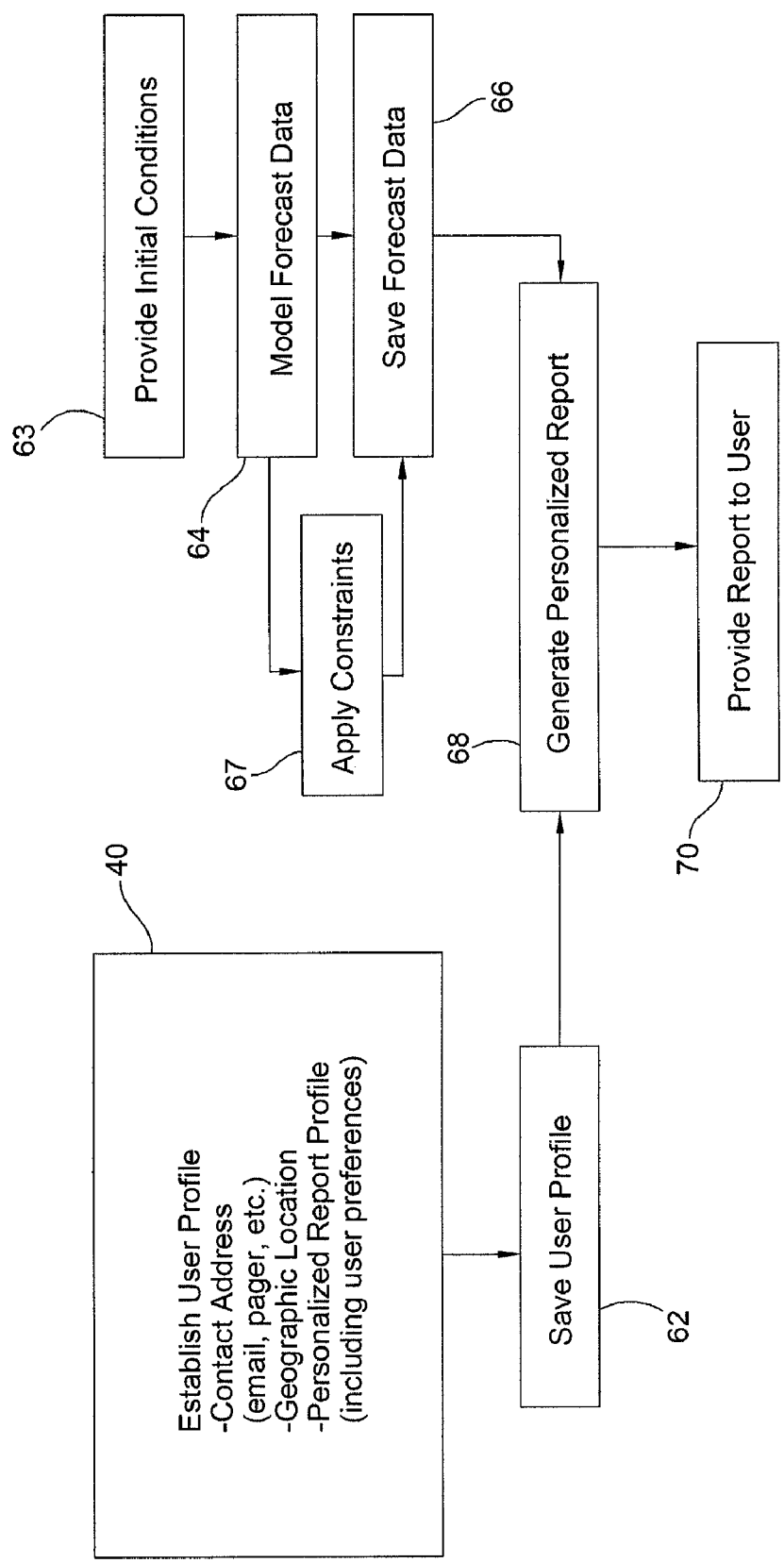
FIG. 2 is a schematic flowchart diagram of an exemplary method for providing personalized weather report presentations in accordance with the present invention.
Figure 4:
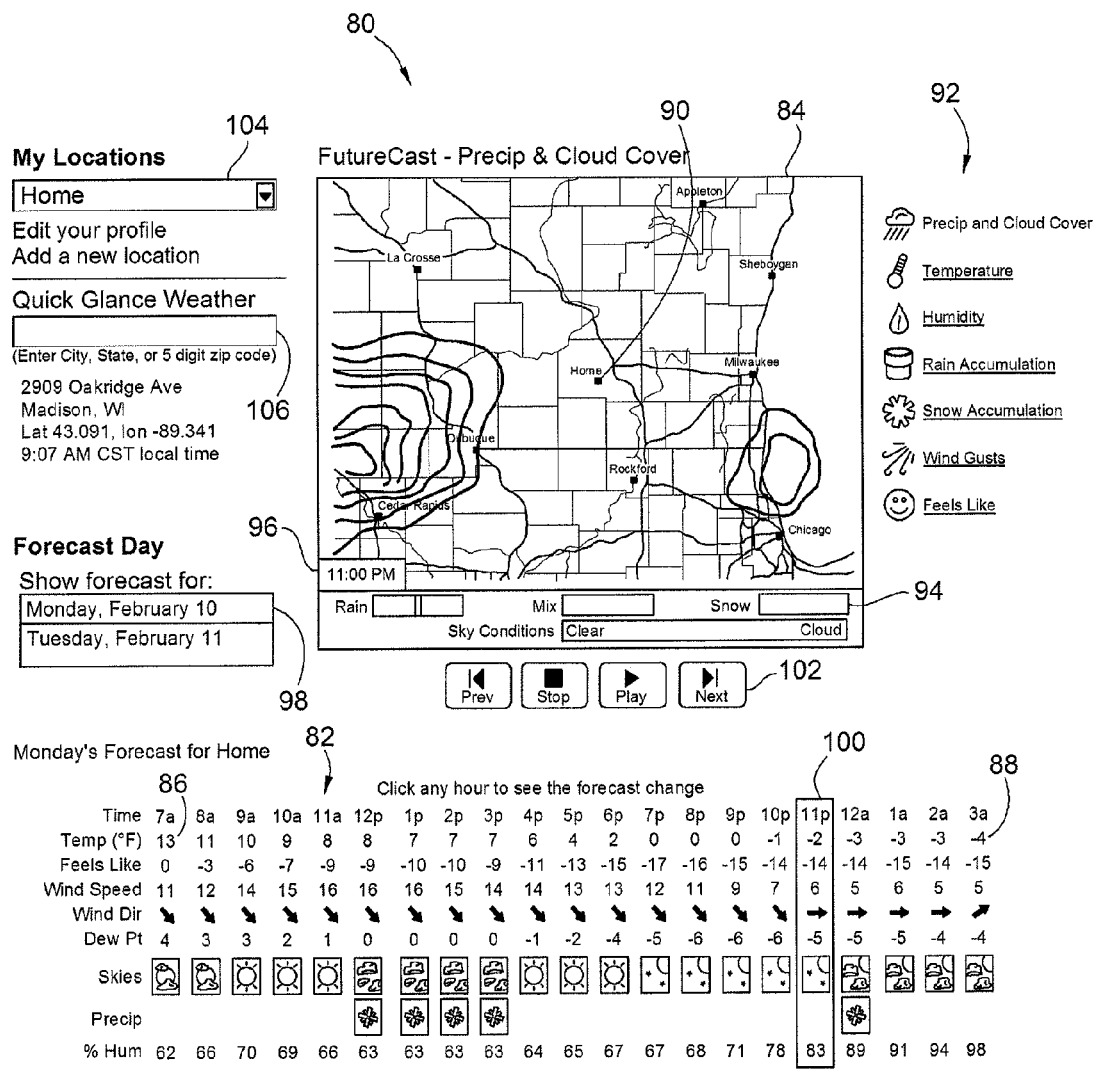
FIGS. 4-6 are exemplary personalized weather report presentations in accordance with the present invention including graphical representations of forecast precipitation and cloud cover conditions overlaid on a map centered at the user location of interest for a sequential series of time periods under user control.
Figure 5:
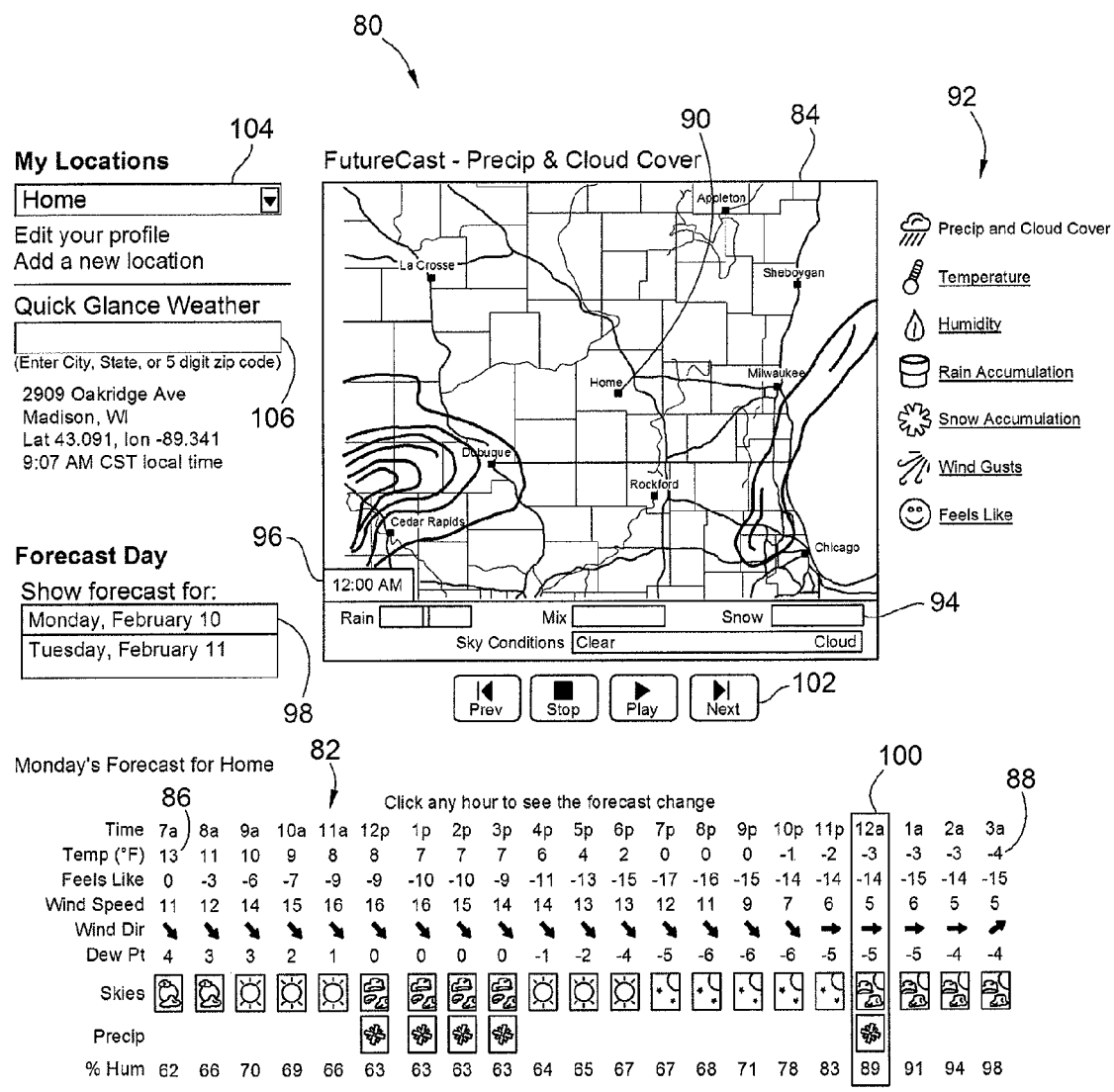
Figure 6:
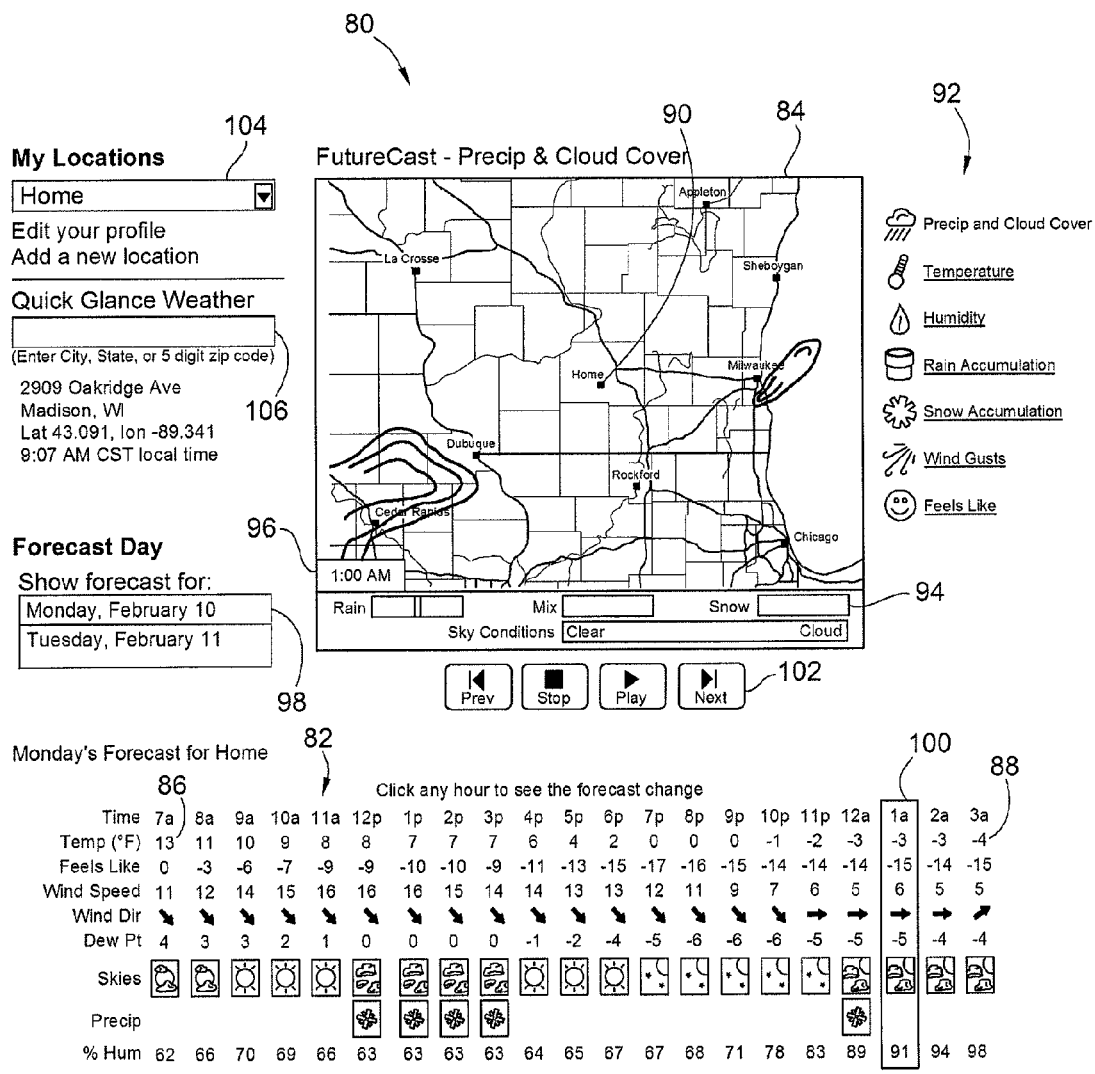
Figure 7:
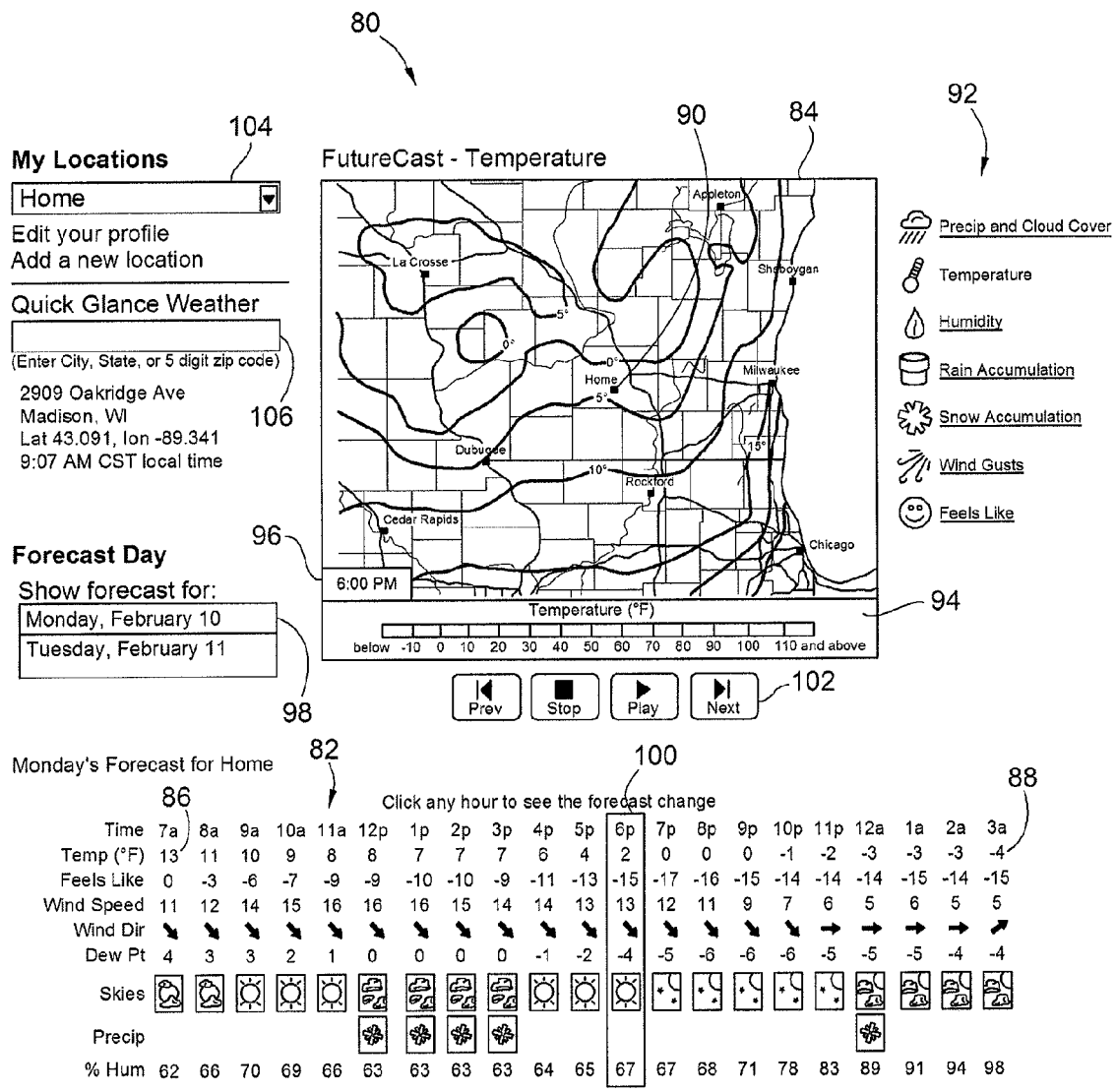
FIGS. 7-9 are exemplary personalized weather report presentations in accordance with the present invention including graphical representations of forecast temperature conditions overlaid on a map centered at the user location of interest for a sequential series of time periods under user control.
Figure 8:
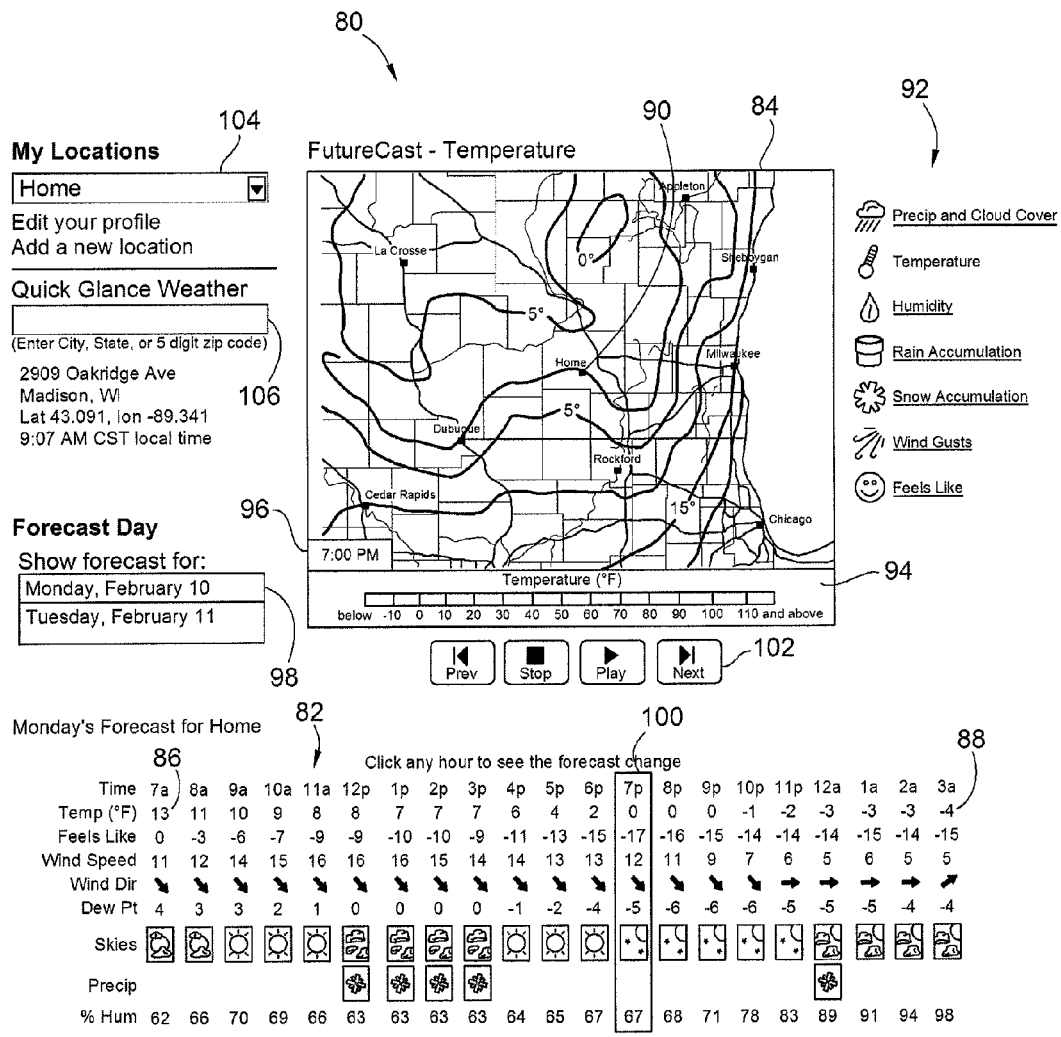
Figure 9:
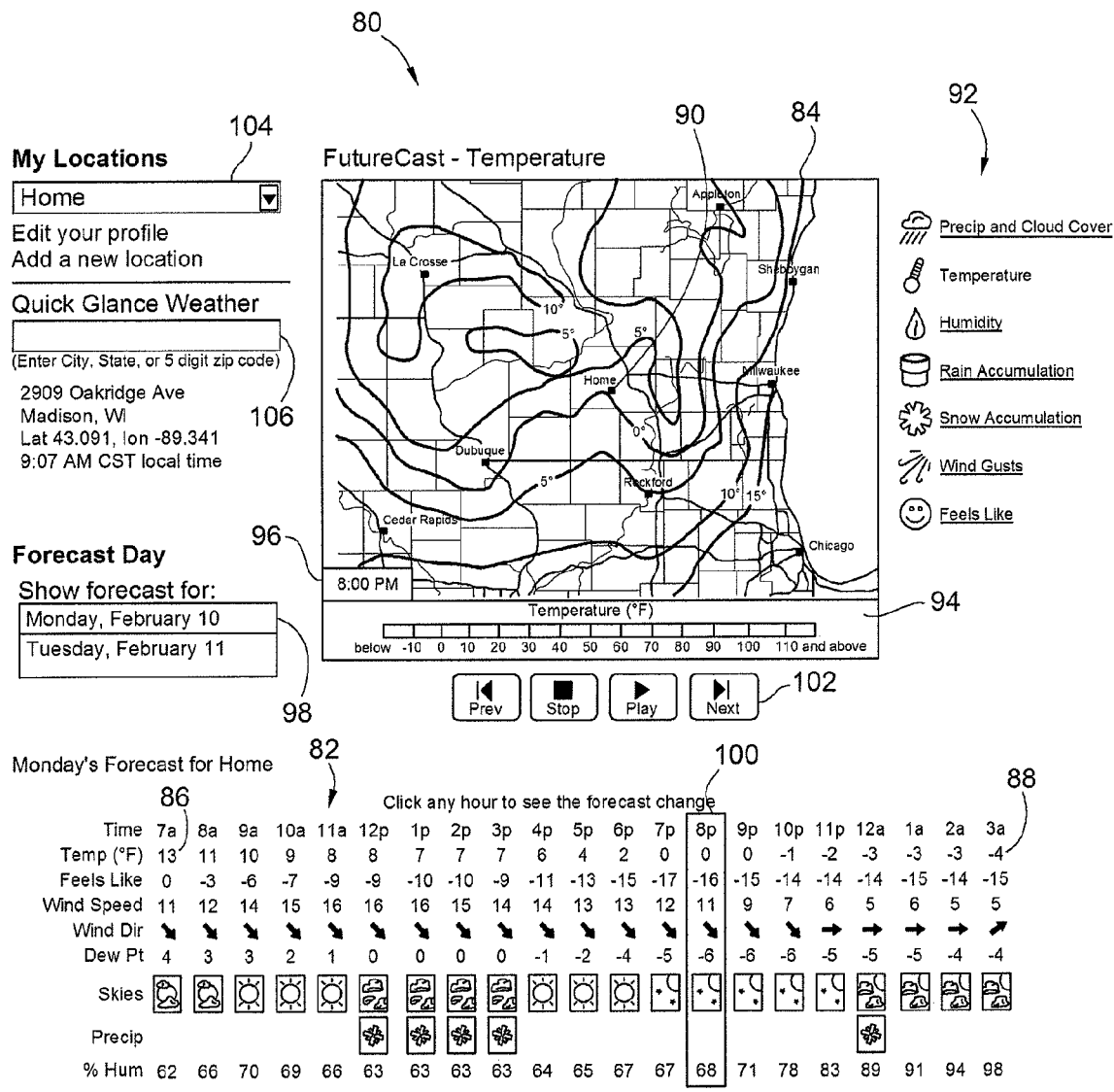
Figure 10:
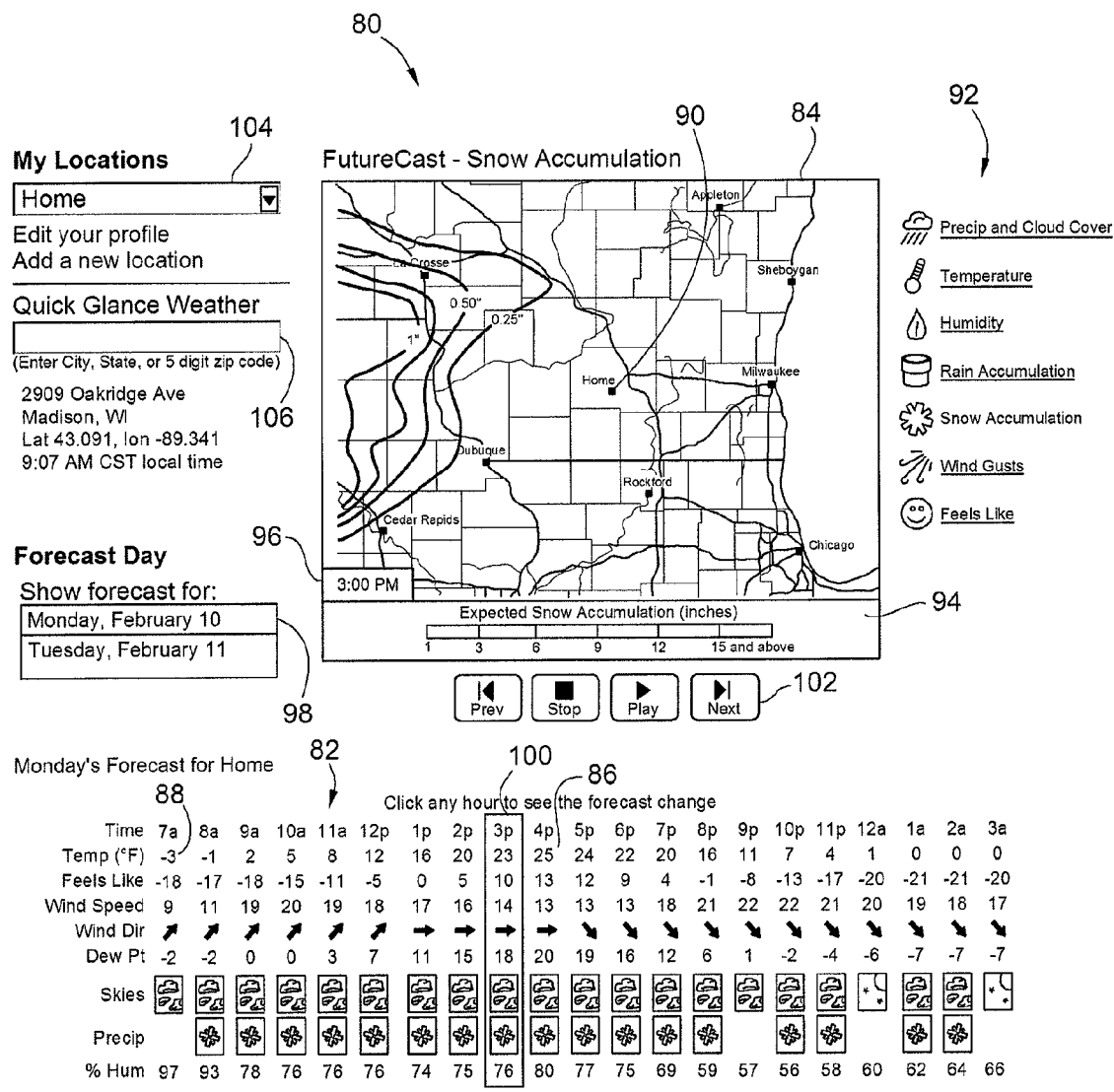
FIGS. 10-12 are exemplary personalized weather report presentations in accordance with the present invention including graphical representations of forecast snow accumulations overlaid on a map centered at the user location of interest for a sequential series of time periods under user control.
Figure 11:
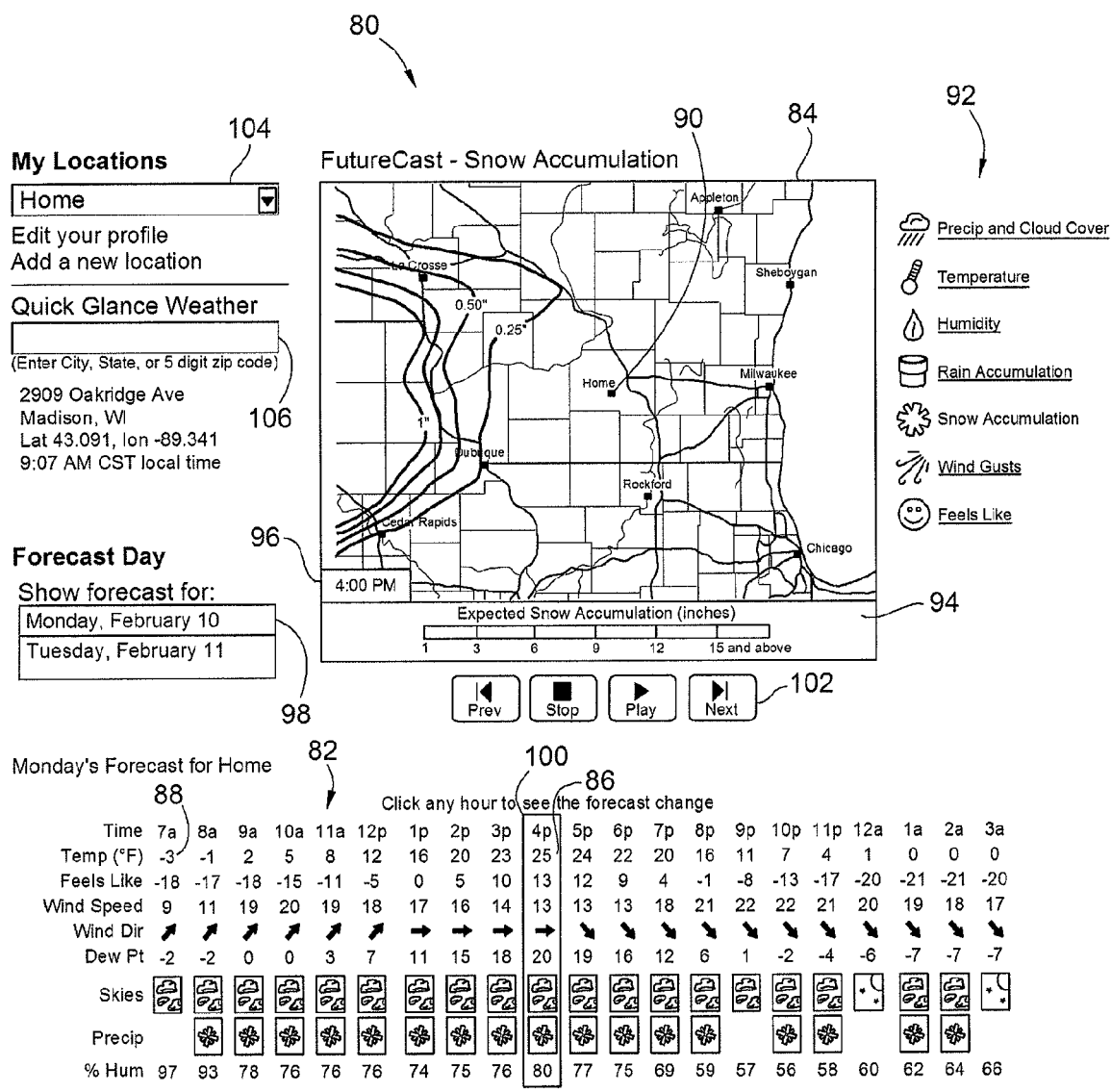
Figure 12:
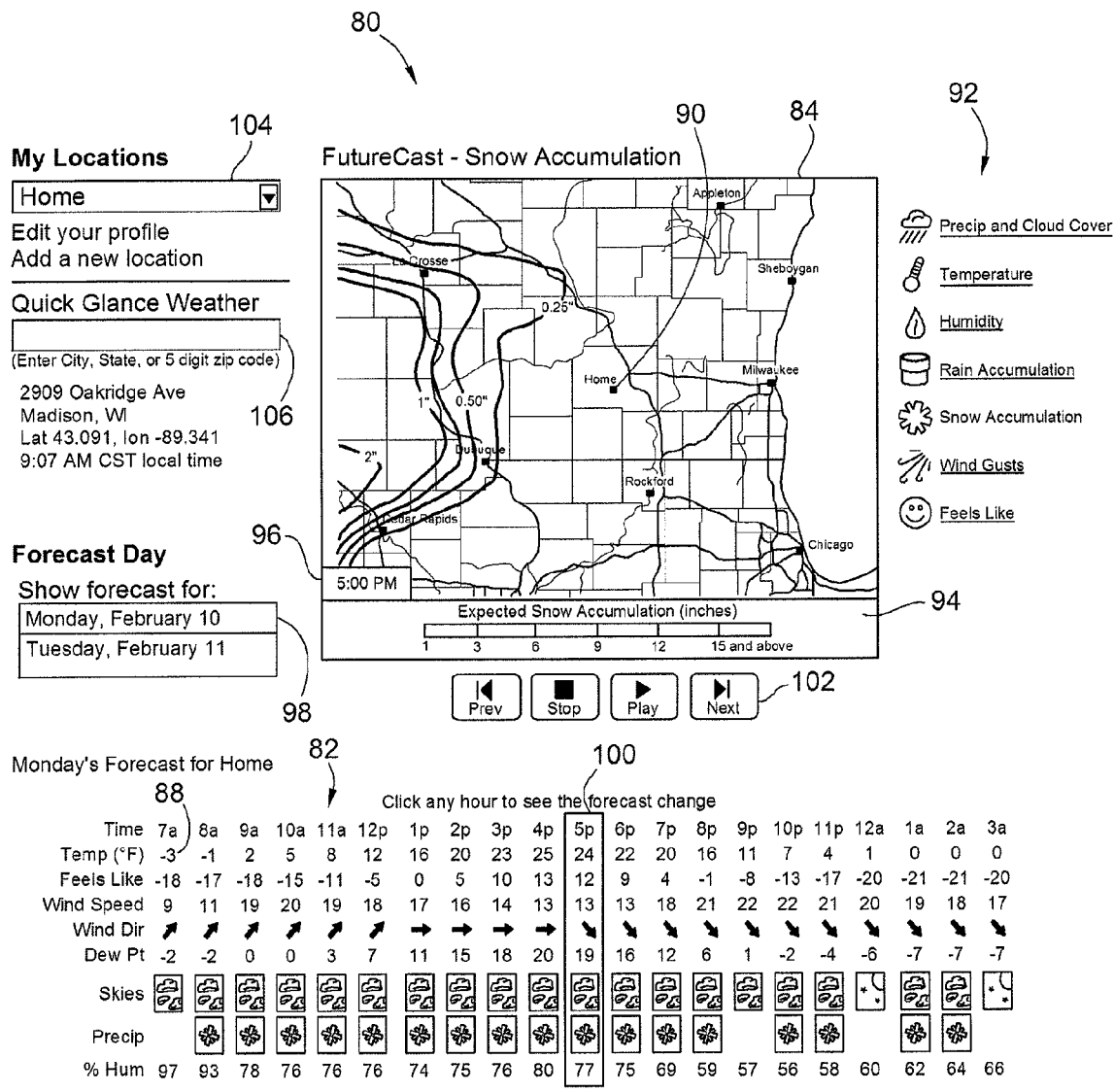

An exemplary method, employing the system 10 described with reference to FIG. 1, for providing personalized weather reports and the like to a user now will be described in detail with reference to the exemplary flowchart diagram of FIG. 2. The process of providing a personalized weather report to a user begins with the establishment of a user profile 40. The user profile may be established by each user himself. For example, a user may establish a user profile by connecting with the main computer system 12 over, e.g., the Internet 14. The user profile generator function, running on the main computer system 12, preferably may provide a user profile set-up menu user interface as a web page which may be accessed by the user over the internet.

An exemplary, and very simplified, user profile set-up menu user interface is illustrated at 42 in FIG. 3. The user profile set-up menu user interface 42 prompts a user to provide a name 44, location identification 46, and contact address 48. (The user profile set-up menu user interface 42 may also may prompt the user to provide other information, e.g., billing, e.g., credit card, information for billing the cost of personalized weather report presentation to the user, in a conventional manner, demographic information 50, etc. The page on which the user profile set-up menu user interface is provided also may include advertisements and hypertext links to other web pages or sites on the Internet, in a conventional manner.)

The computer system 12 may generate automatically a personalized Internet web page address, at which the user's personalized weather report presentation will be accessible, from the information provided by the user via the user profile set-up menu user interface 42. The user's personalized Internet web page address may be provided to the user at the user's contact address 48. For example, the user's personalized internet web page address may be provided in an e-mail message provided to the user's e-mail address contact address.

The location identification 46 is the default geographical location for which the user is interested in receiving a detailed weather report. For example, the location may be the user's home or work location, or the location of business activity, such as a construction site. Various methods may be used for identifying the desired location. For example, the user may provide a street address or a United States Postal Service zip+4 code, either of which will identify the location of interest with sufficient detail. Since the weather forecast model run on the main computer system 12 will typically produce weather forecast data for geographic locations identified by lat/.lon. coordinates, it will typically be necessary to convert the location 46 entered by the user in the user profile set-up menu user interface 42 into a lat./lon. coordinate. For this purpose, the main computer system 12 may employ a geographic location database 24, which may include a table or other data structure for converting street addresses, zip+4 codes, etc. to corresponding lat./lon. coordinates.

Having established a user profile, using the user profile set-up 42 and related user interface menus, the user profile is saved 62 by the main computer system 12, e.g., in a user profile database 26. Of course, many individual user profiles may be established by individual users and saved by the main computer system 12 in the user profile database 26. A user is preferably able to change any user definable portion of his user profile at any time by re-accessing the user profile set-up menu user interface 42, e.g., over the Internet connection 14, and making any desired changes. For security purposes, a user may be requested to establish a user password 52 upon initially establishing a user profile, and may be prompted to enter this password before being allowed to make any changes to a previously established user profile.

Periodically, e.g., twice a day, the main computer system 12 runs 64 the weather forecasting model, as described above, to provide detailed accurate high resolution weather forecast data. As discussed above, depending upon the model employed, the weather forecast model may require initial conditions 30 to be provided thereto 63. For example, initial conditions may be provided to the computer system 12, e.g., twice a day, from a remote central location, and the weather forecast model run 64 each time the initial conditions are provided. The resulting detailed high resolution weather forecast model data is saved by the main computer system 12 into a forecast database 28 at 66. As discussed above, the detailed weather forecast data includes detailed weather condition information, e.g., temperatures, sky conditions, winds, precipitation, etc., for specific geographic locations (preferably no more than a few miles apart) and with a high degree of temporal resolution (e.g., for half-hour increments) extending up to several days into the future. If any constraints 36 on the forecast model data have been provided previously to the computer system 12, such constraints preferably are applied at 67 to the model forecast data before the forecast data is saved 66. Thus, constrained modeled forecast data is saved and 66 and employed to generate personalized weather reports in accordance with the present invention.

The saved weather forecast data from the forecast database 28 is combined by the personalized report generator function in main computer system 12 with the user profile data in the user profile database 26 at 68 to generate a personalized weather report presentation for each user who has established a user profile. The step 68 of generating a personalized weather report may be performed automatically, for example, each time the weather forecast model is run to generate weather forecast data. Alternatively and/or additionally, a personalized weather report presentation in accordance with the present invention may be generated in response to a user request to provide such a report. The personalized weather report is then delivered at 70 to the user, e.g., by providing the personalized weather report presentation as a personalized internet web page or pages, which are accessible by a user at the user's personalized Internet web page address.

Exemplary personalized weather report web page presentations in accordance with the present invention are illustrated in FIGS. 4-12. Note that a personalized internet web page weather report presentation in accordance with the present invention may provide additional or different information, and may have a different format than, the web pages shown by example in FIGS. 4-12. A personalized weather report web page presentation 80 in accordance with the present includes a detailed high resolution textual or tabular weather report 82 for the user location of interest, as a well as a graphical presentation 84 of the weather report for an area surrounding the user location at a particular time. As discussed above, the weather condition information for the tabular weather report 82 and the graphical presentation may be extracted automatically from high resolution weather model forecast data. The high resolution tabular weather report 82 portion of the personalized weather report presentation presents detailed weather condition information for the user's location of interest for several time periods (e.g., each hour) throughout a day in an easily readable form. For example, as illustrated in FIGS. 4-12, weather conditions (e.g., temperature, "feels like" temperature, wind speed, wind direction, dew point, sky conditions, precipitation, and humidity) for each time period (e.g., each hour) through the day may be presented in textual or graphical form in a table 82. Notable weather condition events, such as daily high 86 and low 88 temperatures may be highlighted in bold text and/or different colors (e.g., red for daily highs, blue for daily lows), to bring the time of occurrence of such conditions to a user's attention.

The graphical portion 84 of the personalized weather report presentation 82 includes a graphical representation of one or more weather conditions overlaid on a map of a geographical region surrounding the user's location of interest. Preferably, the map may be centered automatically on the user specified location of interest. A marker 90 preferably indicates the user location of interest on the map. The user location of interest may be labeled on the map with an appropriate label, which may be selected by the user using the user profile-set up menu graphical user interface 42.

The one or more weather conditions displayed on the graphical portion 84 of the personalized weather report presentation 80 preferably are user selectable. For example, the user may be provided with a menu 92 of various weather conditions to be displayed on the graphical display. Such weather conditions may include precipitation and cloud cover, temperature, humidity, rain accumulation, snow accumulation, wind gusts, and "feels like" temperatures. Additional and/or other weather condition options may also be provided.

The particular selected weather condition or conditions displayed on the graphical portion 84 of the personalized weather report presentation 80 may be presented in a standard easily understood manner, such as using contour lines and/or shading of various levels of contrast and/or color. A key 94 preferably is provided for the graphical display which explains the meaning of the various contours, shadings, and colors used in the graphical display. A text box (not shown in the figures) also may be provided to explain what is being displayed in the graphical portion 84 of the personalized weather report presentation 80.

The graphical portion 84 of the personalized weather report presentation 80 shows selected weather conditions for a geographic region for a particular date and time. The date and/or time of the presentation shown in the graphical display 84 preferably is presented 96 as part of, or somewhere near, the graphical display 84 itself.

A user interface 98 preferably is provided as part of the personalized weather report presentation which allows the user to select the day of the weather report as presented in both the tabular 82 and graphical 84 portion of the personalized weather report presentation 80. The user interface may allow the user to select from among days for which reports are available.

In accordance with the present invention, the tabular 82 and graphical 84 portions of the personalized weather report presentation 80 are linked. For example, a user may select the time of the presentation provided in the graphical portion 84 of the weather report presentation by clicking on the desired time listed in the tabular portion 82 of the presentation. Thus, the tabular portion 82 of the presentation provides a user interface for selecting the time of the presentation shown in the graphical portion 84 thereof. The time period represented in the graphical portion 84 of the presentation is preferably indicated by highlighting the portion of the tabular portion 82 of the presentation that corresponds to the time being shown in the graphical portion. For example, the appropriate time column of the table 82 may be highlighted 100 (e.g., in color, boxed, or otherwise) to indicate the time represented in the graphical portion 84 of the display.

Graphical user interface 102 controls preferably also are provided as part of the personalized weather report presentation 80 to allow a user to control the time of the display presented in the graphical portion 84 thereof. These controls may be presented in the form of convention controls for a tape player or VCR so as to be readily understood by most users. For example, PREV and NEXT buttons may be provided as part of the user interface controls 102 to allow the user to advance the graphical display 84 to the previous hour or the next hour, respectively, from the hour currently displayed. A PLAY button may be provided as part of the controls 102 to allow the user to automatically advance the time shown in the graphical display throughout the day at a pre-selected speed. This provides a somewhat animated view of changing weather conditions in the graphical display. The STOP button is provided to allow the automatic sequencing to be stopped. In all cases, the time of the weather conditions currently presented in the graphical display 84 is indicated by highlighting the appropriate portion of the tabular display 82.

As discussed above, the location for the weather report presentation presented in the tabular 82 and graphical 84 portions of the presentation may be the default location of interest defined by a user. A user may define a plurality of such locations of interest. A user interface 104 may be provided to allow the user to select from among such user defined locations. Alternatively, a user may enter a new location 106 of interest to obtain a weather presentation for a new location. As another alternative, the user may on a point on the map shown in the graphical portion 84 of the presentation to indicate a new location of interest. In response to selecting a new location, in any such manner, a new personalized weather report presentation may be generated, in the manner described above, for the new selected location, and the tabular report presentation 82 updated for the new location. The graphical portion 84 of the weather report presentation may be updated to re-center the presentation at the newly selected user location.

It should be understood that the present invention is not limited to the particular embodiments and examples illustrated and described herein, but embraces all such modified forms thereof as come within the scope of the following claims. For example, even though the use of the present invention to generate personalized weather report presentations of forecast weather conditions is described herein, the present invention also may be used to provide personalized weather report presentations of past and current weather conditions.

What is claimed is:

1. A method for presenting personalized weather information, comprising:
    (a) selecting a single location of interest;
    (b) determining weather conditions for the single location of interest and for a geographic area around the single location of interest for a plurality of time periods;
    (c) presenting a tabular representation of the weather conditions, the tabular representation displaying weather conditions at the single location of interest for the plurality of time periods; and
    (d) presenting simultaneously with the tabular representation a graphical representation of
        a map of a geographical area including the single location of interest and
        at least one weather condition overlaid on the map for the single location of interest associated with at least one of the plurality of time periods.

2. The method of claim 1 wherein selecting a location of interest includes providing a user interface to a user over a computer network.

3. The method of claim 1 wherein determining weather conditions for the location of interest includes running a computer based weather forecast model for an area including the location of interest.

4. The method of claim 1 wherein presenting a tabular representation of the weather conditions for the location of interest includes presenting a tabular representation of the weather conditions for the location of interest for at least each hour throughout a day.

5. The method of claim 1 wherein presenting a tabular representation of weather conditions for the location of interest includes presenting a tabular representation of a plurality of weather conditions selected from the group of weather conditions consisting of temperature, "feels like" temperature, wind speed, wind direction, dew point, sky conditions, precipitation, and humidity.

6. The method of claim 1 wherein presenting a graphical representation of at least one weather condition includes presenting a graphical representation of at least one weather condition selected from the group of weather conditions consisting of precipitation, cloud cover, temperature, humidity, rain accumulation, snow accumulation, wind gusts, and "feels like" temperatures for the location of interest and the geographic area around the location of interest overlaid on a map of a geographical area including the location of interest.

7. The method of claim 1 wherein presenting a graphical representation includes presenting at least one weather condition for the location of interest and the geographic area around the location of interest overlaid on a map of a geographical area including the location of interest and centered on the location of interest.

8. The method of claim 1 including additionally highlighting a portion of the tabular representation of weather conditions for the location of interest corresponding to the time period of the graphical representation of the weather conditions for the location of interest and the geographic area around the location of interest.

9. The method of claim 1 comprising additionally changing the location of interest by indicating a new location of interest on the map of a geographical area including the area of interest.

10. A computer-implemented method for presenting personalized weather information, comprising:
    (a) receiving a location of interest;
    (b) determining weather conditions for the location of interest and for a geographic area around the location of interest for a plurality of time periods;
    (c) presenting a tabular representation of the weather conditions, the tabular representation displaying weather conditions at the single location of interest for the plurality of time periods; and
    (d) presenting simultaneously with the tabular representation a graphical representation of
        a map of the geographical area including the single location of interest and
        at least one weather condition overlaid on the map associated with a selected one of the plurality of time periods.

11. The method of claim 10, wherein receiving a location of interest includes receiving the location using a user interface to a user over a computer network.

12. The method of claim 10, wherein determining weather conditions for the location of interest includes utilizing a computer based weather forecast model to generate the weather conditions for an area including the location of interest.

13. The method of claim 12, wherein determining weather conditions for the location of interest includes extrapolating between one or more closely spaced points near the location of interest to generate weather conditions specific to the location of interest.

14. The method of claim 10, wherein presenting a tabular representation of the weather conditions for the location of interest includes at least one of presenting a tabular representation of the weather conditions for the location of interest for at least each hour throughout a day and presenting a tabular representation of a plurality of weather conditions selected from the group of weather conditions consisting of temperature, "feels like" temperature, wind speed, wind direction, dew point, sky conditions, precipitation, and humidity.

15. The method of claim 10, wherein presenting a graphical representation of at least one weather condition includes presenting a graphical representation of at least one weather condition selected from the group of weather conditions consisting of precipitation, cloud cover, temperature, humidity, rain accumulation, snow accumulation, wind gusts, and "feels like" temperatures for the location of interest and the geographic area around the location of interest overlaid on a map of a geographical area including the location of interest.

16. The method of claim 10, wherein presenting a graphical representation includes presenting at least one weather condition for the location of interest and the geographic area around the location of interest overlaid on a map of a geographical area including the location of interest and centered on the location of interest.

17. The method of claim 10, further including additionally highlighting a portion of the tabular representation of weather conditions for the location of interest corresponding to the time period of the graphical representation of the weather conditions for the location of interest and the geographic area around the location of interest.

18. The method of claim 10, further including changing the location of interest upon selection of a new location of interest on the map of a geographical area including the area of interest.

19. A computer-implemented system for presenting personalized weather information, comprising:
 a user interface configured to receive a location of interest;
 a weather forecasting system configured to determine weather conditions for the location of interest and for a geographic area around the location of interest for a plurality of time periods; and
 a weather presentation system configured to:
  present a tabular representation of the weather conditions at the single location of interest for the plurality of time periods and
  presenting simultaneously with the tabular representation a graphical representation of a map of the geographical area including the single location of interest and at least one weather condition overlaid on the map associated with a selected one of the plurality of time periods.

20. The system of claim 18, wherein the weather forecasting system is configured to extrapolate between one or more closely spaced points near the location of interest to generate weather conditions specific to the location of interest.

* * * * *